(12) United States Patent
Flakne

(10) Patent No.: US 7,299,719 B1
(45) Date of Patent: Nov. 27, 2007

(54) SHOVEL PLOW APPARATUS

(76) Inventor: Chad Edward Flakne, 700 10th Ave. N., St. Cloud, MN (US) 56303

( * ) Notice: Subject to any disclaimer, the term of this patent is extended or adjusted under 35 U.S.C. 154(b) by 23 days.

(21) Appl. No.: 11/414,985

(22) Filed: May 1, 2006

Related U.S. Application Data

(60) Provisional application No. 60/676,722, filed on May 2, 2005.

(51) Int. Cl.
*E04D 15/02* (2006.01)
*A01D 9/02* (2006.01)

(52) U.S. Cl. .......................... 81/45; 294/55.5

(58) Field of Classification Search ............... 81/45; 294/49, 50, 55.5
See application file for complete search history.

(56) References Cited

U.S. PATENT DOCUMENTS

| | | | |
|---|---|---|---|
| 894,491 A * | 7/1908 | Frees ........................ | 294/50 |
| 1,218,145 A * | 3/1917 | Whittier ..................... | 81/45 |
| 3,781,053 A * | 12/1973 | Wicks ....................... | 294/55.5 |
| 4,809,436 A | 3/1989 | Crookston | |
| D310,773 S | 9/1990 | Frady | |
| D320,149 S | 9/1991 | Owens | |
| D359,434 S | 6/1995 | Gibson | |
| 5,527,077 A * | 6/1996 | Bickar ....................... | 294/52 |
| D377,140 S | 1/1997 | Bair | |
| D407,619 S | 4/1999 | Trottier | |
| 5,893,304 A * | 4/1999 | Carroll ...................... | 81/45 |
| 6,029,545 A * | 2/2000 | Harpell ..................... | 81/45 |
| 6,070,498 A * | 6/2000 | Mislich et al. .............. | 81/45 |
| 6,125,720 A | 10/2000 | Gohman | |
| D439,126 S | 3/2001 | Gohman | |
| 6,318,213 B1 | 11/2001 | Hendrix | |
| 6,339,975 B1 * | 1/2002 | Harpell ..................... | 81/45 |
| D471,071 S | 3/2003 | Richards | |
| 2006/0156866 A1 * | 7/2006 | Ingell ....................... | 81/45 |

* cited by examiner

*Primary Examiner*—David B Thomas
(74) *Attorney, Agent, or Firm*—Robert C. Montgomery

(57) ABSTRACT

The novel, hand-held apparatus aids in the removal of old shingles from the roofs of structures. The tool is comprised of a handle; an elongated pole member; and a set of two tines affixed together at an angle which is then mounted onto said pole member. The set of tines is upwardly curved with respect to the handle portion. The first set of tines initiates the stripping of the shingles with a plowing motion, while the second set of similar tines is affixed to the upper surface of the first set of tines, with an upward curvature, to facilitate the lifting and removal of the shingles. The apparatus herein described can equally be utilized as a short handle pitch fork having a dual set of tines making a multitude of agricultural and horticultural tasks more efficient.

5 Claims, 6 Drawing Sheets

SHOVEL PLOW APPARATUS

RELATED APPLICATIONS

The present invention was first described in Disclosure Document Registration No. 559,647 filed on Aug. 25, 2004; and subsequently, in U.S. Provisional Patent Application No. 60/676,722 filed on May 2, 2005. There are no other current, co-pending, non-provisional patent applications anywhere in the world.

FIELD OF THE INVENTION

The present invention relates generally to the removal of shingles from a roof and, more particularly to, a hand-held, plowing apparatus capable of efficient lifting and stripping of old shingles from roofs.

BACKGROUND OF THE INVENTION

Roofs of structures requiring the removal of old shingles, commonly referred to as a "tear-off", is strenuous, physical and sometimes hazardous work. The old shingles must be dislodged, ripped up and then pushed off of the roof. These actions typically require a variety of hand tools and a significant amount of physical exertion to accomplish the task. It is both time consuming and tiresome. Accordingly, there exists a need for a means by which the removal of old shingles on a roof can be accomplished in a simpler and easier manner than current methods allow.

Several attempts have been made in the past to make the physical removal of a roof less laborious. U.S. Pat. No. D 407,619 issued in the name of Trottier provides for the design of a shingle removal tool that is angled, having multiple teeth and can be used with one hand.

U.S. Pat. No. D377,140 issued in the name of Bair provides for the design of a shingle removal tool that is a single, elongated bar with a curvature forming into a pistol-grip handle for a person to hold while prying shingles from a roof.

U.S. Pat. No. D359,434 issued in the name of Gibson provides for the design of a roofing shingle remover, having a curved to a flat base that has a plurality of teeth. A handle, for use with one hand, is on the opposite end.

U.S. Pat. No. D320,149 issued in the name of Owens provides for the design of a shovel head for a shingle removing tool. The disclosed head design would be attached to a shovel length handle that would be operated with both hands.

U.S. Pat. No. D310,773 issued in the name of Frady provides for the design of a slate shingle remover. The remover is a single handed tool with a heavy duty pry bar end and a manual impact handle.

U.S. Pat. No. D439,126 issued in the name of Gohman provides for the design of a roofing material removal tool. The tool has a medium length manual handle that is attached to flat base plate that has multiple teeth.

U.S. Pat. No. D471,071 issued in the name of Richards provides for the design of a hand tool that is used for the removal of shingle from a roof. The tool is a one handed implement having a handle that is elevated over a flat push scraper base.

U.S. Pat. No. 4,809,436 issued in the name of Crookston discloses a shingle stripping hand tool that strips shingles using a flat blade with teeth and a backward facing fulcrum for prying action that is attached to a handle.

U.S. Pat. No. 6,125,720 issued in the name of Gohman discloses a tool for removing roofing material that is comprised of a handle attached to a scraping and lifting blade that has teeth, and with said handle being adjustable by the user.

U.S. Pat. No. 6,318,213 issued in the name of Hendrix, et al. discloses a roofer's shingle removal tool with an elongated handle and a serrated blade that is curved to facilitate lifting and stripping of wood and asphalt shingles from a roof.

None of the prior art particularly describes an apparatus or the method of manually stripping shingles from a roof with a two-handed tool having an elongated handle with two sets of tines that makes the task of removing shingles significantly more efficient.

SUMMARY OF THE INVENTION

In view of the foregoing disadvantages inherent in the prior art, it has been observed that there is a defined need for a hand tool and a method to more effectively remove old wood and asphalt shingles from a roof. Therefore, it is an object of the present invention to obviate the above and other disadvantages present in existing art.

It is further an object of the present invention to provide an apparatus that aids in the removal of old asphalt style shingles from roofs, that can also be used as a conventional short handled pitchfork commonly used to dig potatoes or to move mulch, leaves, manure and other similar gardening materials.

To achieve the above and other objectives, the present invention provides a shingle plow apparatus comprising a handle portion having a grip with ends that are mechanically attached to two arms at each end, the arms further extending sharply downwards and tapering to a hollow cylindrical mount, an elongated pole having a tapered first and second end and a longitudinal center diametrically similar to said cylindrical mount, the pole mechanically coupled to the cylindrical mount at the first end and to a tine mount at the second end, a first tine portion having a plurality of concave first tines extending therefrom, the first tine portion mechanically coupled to the tine mount, and a second tine portion having a plurality of concave second tines extending therefrom, the plurality of second tines adjustably affixed to the plurality of first tines.

It is further an object of the present invention to provide a tine assembly capable of mounting on a plow apparatus having an elongated pole, comprising a first tine portion having a plurality of concave first tines extending therefrom, the first tine portion mechanically coupled to the plow pole, and a second tine portion having a plurality of concave second tines extending therefrom and equinumber thereto of said first tines, adjustably affixed on each corresponding plurality of first tines of the first tine portion at a sloping angle, the second tine portion further concavely oriented in the direction of slope of the first tine portion, resulting in an angle of affixing of the second tine portion to the first tine portion.

It is further an object of the present invention to provide a method of removing shingles using a shingle plow apparatus having a grip, a pole, a first tine portion and a second tine portion with a plurality of first and second tines. The method comprises gripping the handle of the plow using said grip, inserting the plurality of first tines of said first tine portion underneath the shingle to be removed, pushing the plow for digging underneath said shingle for discarding the same in a direction opposite to the direction of push by forcing said shingle up onto said second tine portion thereby removing said shingle off the surface.

It is further an object of the present invention to provide a shingle plow apparatus such that the second tines are attached to the conventional first tines, approximately six inches back from the tip and at an approximate angle of 30 degrees, thereby allowing the user to push or "plow" old shingles from a roof without moving the handle up or down. The lower set of tines gets under the shingles, and as it is pushed along, allows the upper set of tines to lift the shingles and break them free. The use of the apparatus allows roofers to complete a roofing job more quickly, and in a safe manner, without the necessary time spent, cutting shingles ahead of time or on an as-needed basis.

To achieve the above and other objectives, the present invention advances the art by providing an efficient method of removing old wood and asphalt shingles from a structure's roof by means of a new and novel, hand-held apparatus having two sets of multiple tines affixed one to the other at an approximately 30 degree angle and attached to an elongated handle that allows a person to use both hands effectively in performing the task. Said apparatus could be additionally used as a pitchfork for a plurality of uses including, but not limited to: harvesting potatoes, moving mulch, raking leaves and spreading manure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
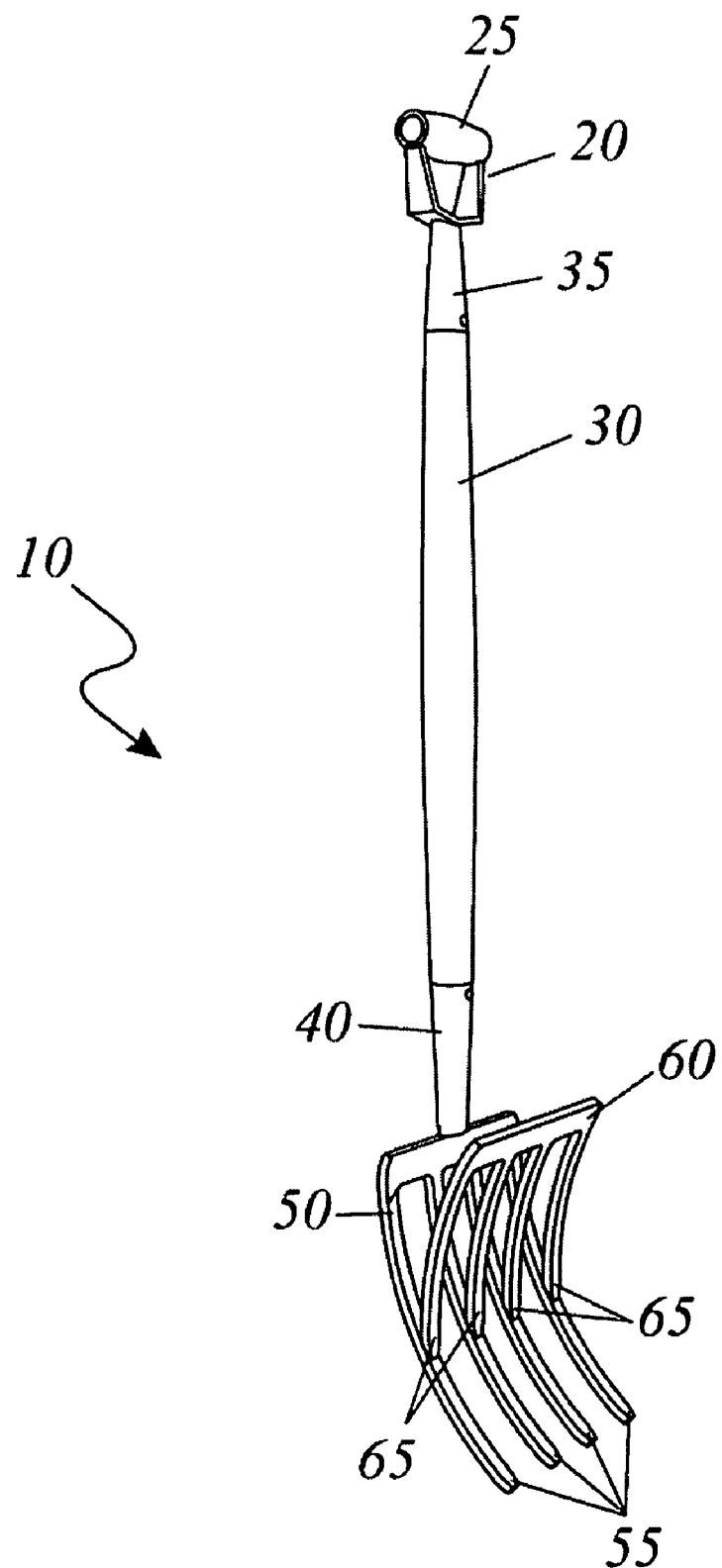
FIG. 1 is a perspective view of the shovel plow apparatus 10 according to a preferred embodiment of the present invention; and, FIG. 2 is an front view of the shovel plow apparatus 10, according to a preferred embodiment of the present invention; and, FIG. 3 is a rear view of the shovel plow apparatus 10 with a bottom opening door 16, according to a preferred embodiment of the present invention; and, FIG. 4 is a side view of the shovel plow apparatus 10, according to a preferred embodiment of the present invention; and, FIG. 5 is a top view of the shovel plow apparatus 10, according to a preferred embodiment of the present invention; and, FIG. 6 is a bottom view of the shovel plow apparatus 10, according to a preferred embodiment of the present invention.
Figure 2:
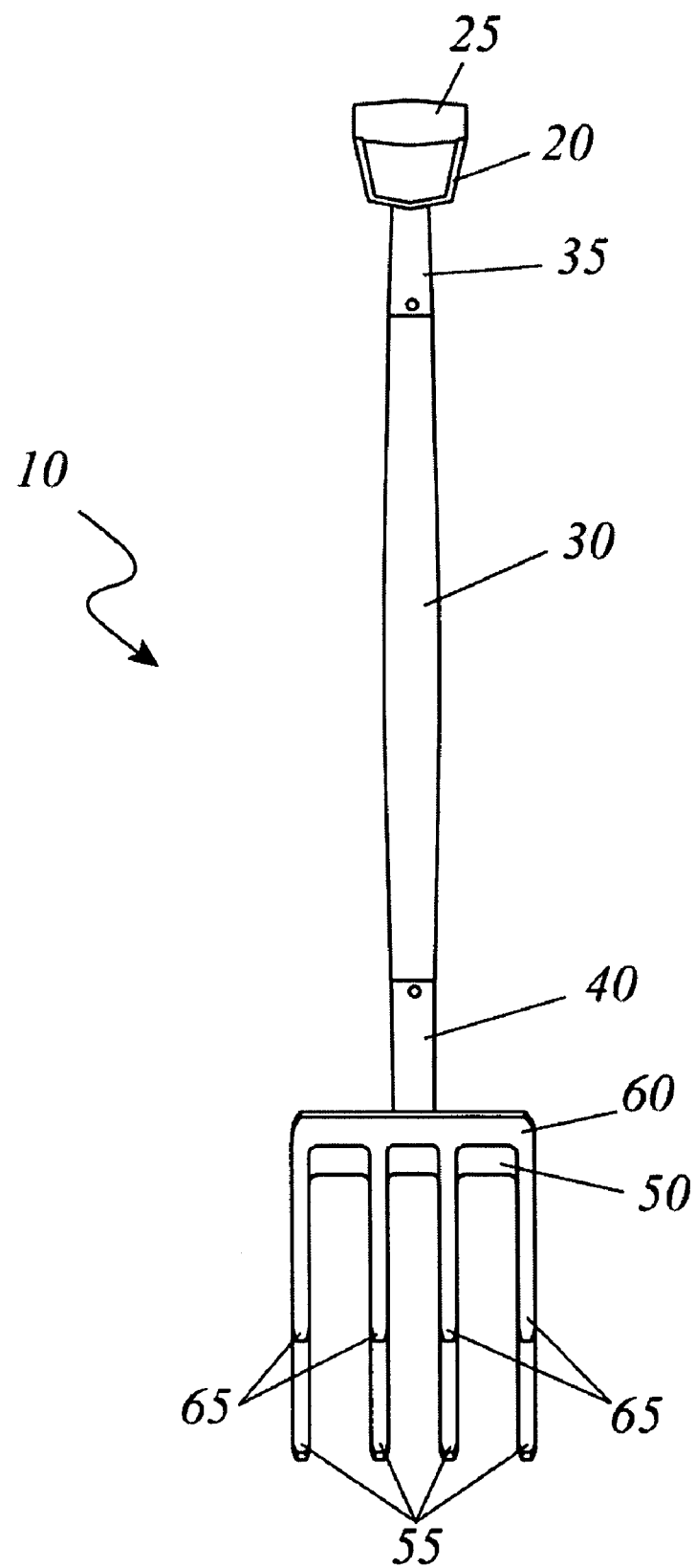
Figure 3:
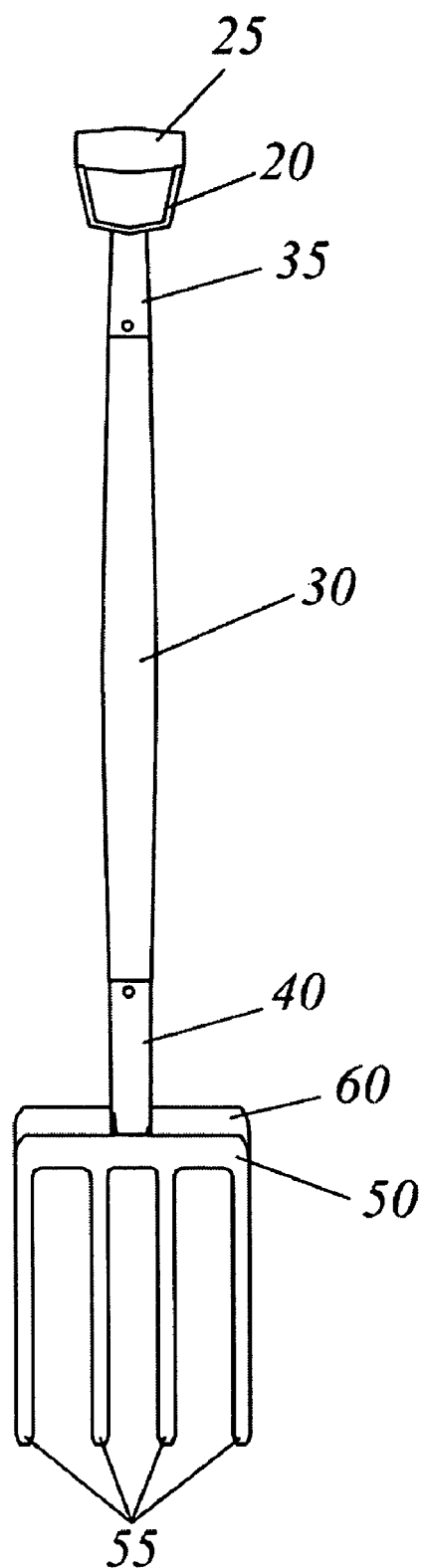
Figure 4:
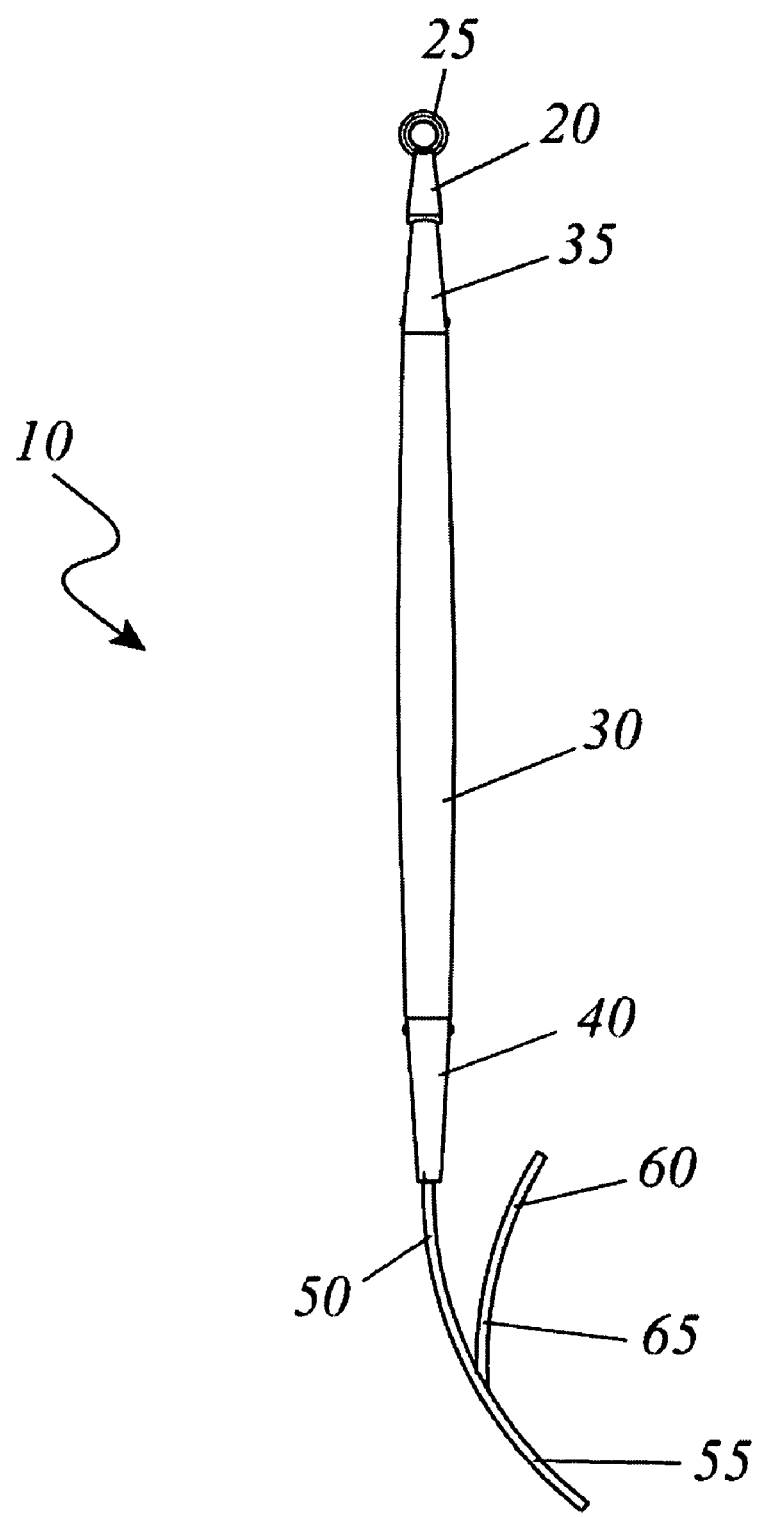
Figure 5:
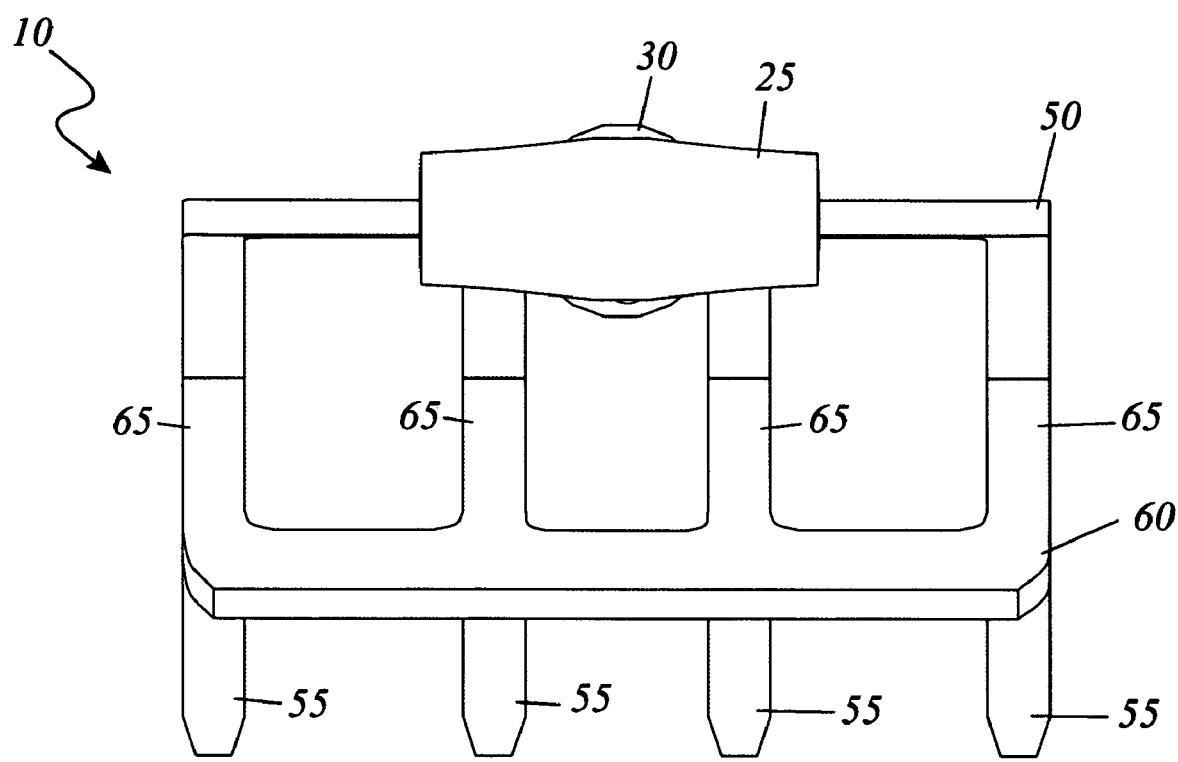
Figure 6:
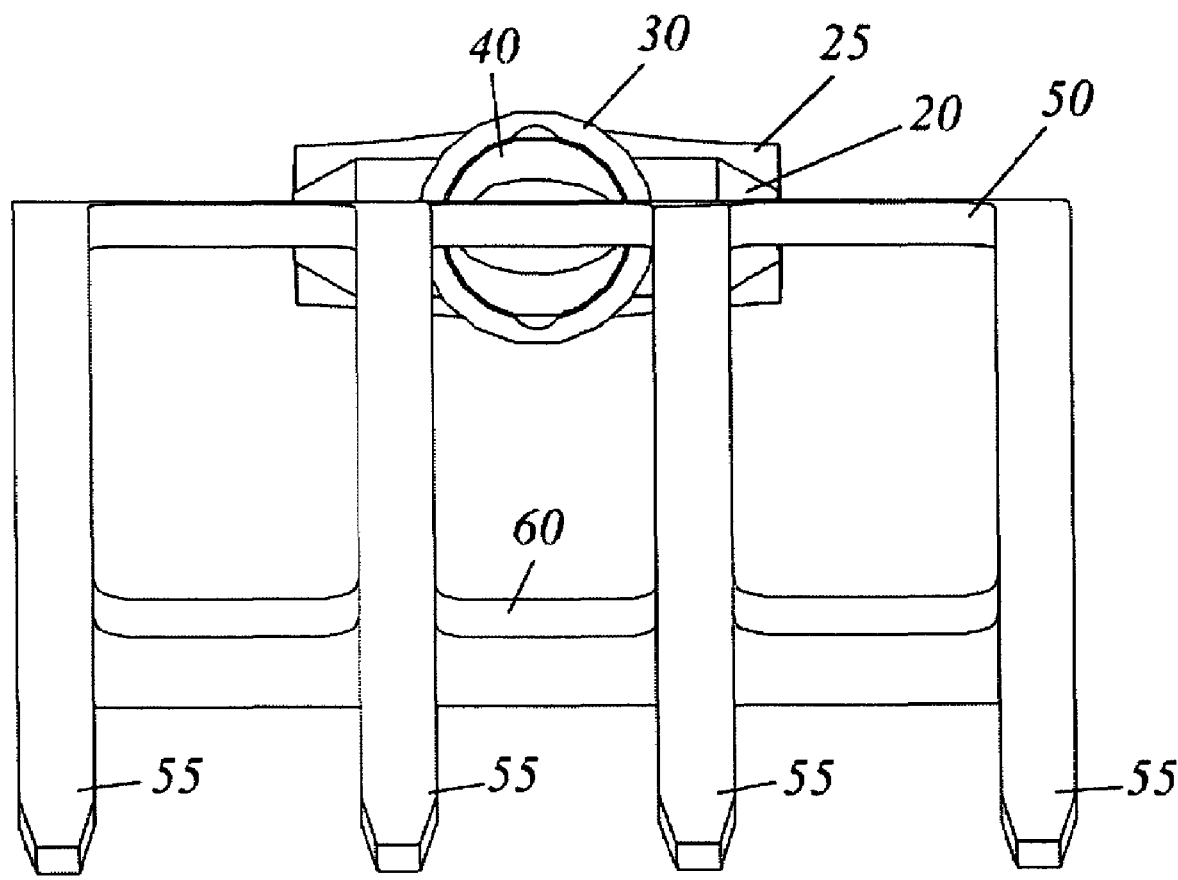

DESCRIPTIVE KEY 10 shovel plow apparatus
20 handle
25 grip
30 pole
35 handle mount
40 tine mount
50 first tine portion
55 first tine
56 joint
60 second tine portion
65 second tine

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention. Any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for assisting in the transportation of old roofing material. The roof shingle dump cart with hopper (herein described as the "apparatus") 10 consists of a hopper system, an adjustable leg assembly and a caster wheel assembly.

Referring now to FIG. 1, a perspective view of the shovel plow apparatus 10 (herein described as the "apparatus") is disclosed in accordance with the handle portion 20; an elongated pole portion 30; and a first and second tine portion 50, 60.

The handle portion 20 of the device comprises a gripping portion 25 ergonomically fabricated to comfortably fit in the palm of the user's hand mechanically attached to two (2) arms at each end of the grip 25. The arms extend downward and then sharply taper to a hollow cylindrical body, the handle mount 35, which is affixed to the elongated pole portion 30. The entire handle portion 20 may be fabricated out of metal, plastic, or any other sturdy and durable material.

The elongated pole portion 30 is cylindrical in shape and has a diameter similar to that of the handle mount 35 and tine mount 40. Each distal end of the pole portion 30 tapers slightly downward in diameter to allow it to be inserted into the handle mount 35 at the top end and the tine mount 40 at the bottom end. The pole portion 30 is of a sufficient length to allow the user to utilize the device 10 at a standing position and may be manufactured out of similar materials as the handle portion 20.

The first and second tine portions 50, 60 of the apparatus 10 is comprised of two (2) parts, both consisting of the same structure and material of construction, preferably fabricated out of high grade carbon steel for its durability and chemical resistance. The design of the both first and second tines 50, 60 is similar to a fork, comprising: a wider base and a length suitable to fully lift a shingle; a plurality of four (4) first and second tines 55, 65 of equal length and width; and curved in a slightly concave shape. The first tine portion 50 includes a hollow, cylindrical tine mount 40 of a similar diameter to the pole portion 30 and receives said pole portion 30 therein and affixed thereto. The second tine portion 60 is affixed via mechanical or adhesive means 56 to the first tine portion 50. The ends of each second tine 65 on the second tine portion 60 is adjustably affixed to each corresponding first tine 55 on the first tine portion 50 at approximately half the length from the tip and at a gently sloping angle. The orientation of the second tine portion 60 must allow for the concave slope to be facing in the same direction as the slope of the first tine portion 50, accounting for the angle of affixing said second tine portion 60 to said first tine portion 50.

The preferred embodiment of the present invention is designed to be used by a normal person with no special skills or training necessary. During the physical and strenuous task of removing old asphalt shingles from roofs requiring repair or restoration, the proper use of the shingle plow apparatus 10 is herein disclosed: the user grips the device at the grip portion 25 of the handle 20 and inserts the first tines 55 of the first tine portion 50 underneath the shingle that is to be removed. With a "pushing" or "plowing" motion, the user digs the apparatus 10 directly underneath the shingle to lift it off the roof and then makes an upward motion with the apparatus 10. This second action breaks the shingle free and discards it generally in the opposite direction of the user by forcing the shingle up onto the second tine portion 60. The slightly curved shape of both the first and second tines 50, 60 minimize any reactive forces due to friction and scoops and throws the lifted shingle from the roof.

FIGS. 2-6 illustrate various viewing angles of the present invention 10 to provide greater detailed viewpoints of the features of said present invention 10.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiment was chosen and described in order to best explain the principles of the invention and its practical application to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A shingle plow apparatus comprising:
    a handle portion having a grip with ends mechanically attached to two arms at each end, said arms extending sharply downwards and tapering to a hollow cylindrical mount;
    an elongated pole having each a tapered first and second end and a longitudinal center diametrically similar to said cylindrical mount, said elongated pole mechanically coupled to said cylindrical mount at said first end and to a tine mount at said second end;
    a first tine portion having a plurality of concave first tines extending therefrom, said first tine portion mechanically coupled to said tine mount; and
    a second tine portion having a plurality of concave second tines extending therefrom, said plurality of second tines adjustably affixed to said plurality of first tines.

2. The shingle plow apparatus of claim 1, wherein said sloping angle is 30 degrees and said second tine portion is adjustably fixed at least 6 inches from a tip of said first tine portion.

3. A tine assembly capable of mounting on a plow apparatus having an elongated pole, comprising:
    a first tine portion having a plurality of concave first tines extending therefrom, said first tine portion mechanically coupled to said plow pole; and
    a second tine portion having a plurality of concave second tines extending therefrom and equal in number thereto of said first tines, said plurality of second tines adjustably affixed on each said corresponding plurality of first tines of said first tine portion at a sloping angle, said second tine portion further concavely oriented in the direction of slope of the first tine portion, resulting in an angle of affixing of said second tine portion to said first tine portion.

4. The tine assembly of claim 3, wherein said sloping angle is 30 degrees and said second tine portion is adjustably fixed at least 6 inches from a tip of said first tine portion.

5. A method of removing a shingle using a shingle plow apparatus having a grip, a pole, a first tine portion and a second tine portion fixed to said first tine portion with a plurality of first and second tines, said method comprising the steps of:
    gripping said handle of said shingle plow apparatus using said grip;
    inserting said plurality of first tines of said first tine portion underneath said shingle to be removed,
    pushing said plow for stripping said shingle for discarding said shingle in a direction opposite to the direction of push by forcing said shingle up onto said second tine portion; and,
    removing said shingle off said shingle plow apparatus.

* * * * *